April 13, 1926.

L. D. WOODRUFF 1,580,462

SLEEVE TYPE BALL JOINT

Filed June 26, 1922

Inventor
L. D. Woodruff
By
Church & Church
His Attorneys

Patented Apr. 13, 1926.

1,580,462

UNITED STATES PATENT OFFICE.

LEONIDAS D. WOODRUFF, OF CHICAGO, ILLINOIS, ASSIGNOR TO ADELINE R. WOODRUFF, OF CHICAGO, ILLINOIS.

SLEEVE-TYPE BALL JOINT.

Application filed June 26, 1922. Serial No. 570,789.

*To all whom it may concern:*

Be it known that I, LEONIDAS D. WOODRUFF, a citizen of the United States, residing at Chicago, in the county of Cook and State of Illinois, have invented certain new and useful Improvements in Sleeve-Type Ball Joints; and I do hereby declare the following to be a full, clear, and exact description of the same, reference being had to the accompanying drawings, forming part of this specification.

This invention relates to joints of the ball and socket variety for general use although particularly adapted in connection with the steam piping of railway trains.

The principal object of the present invention is to provide a sleeve type ball joint of such design as to permit the use of gaskets cut from ordinary sheet packing of the proper material.

A second object of the present invention is the provision of a ball joint which can be manufactured at a lower cost than the usual types by virtue of the illustrated construction which eliminates to a large measure the machining of parts hitherto thought essential.

In the drawings:—

Figure 1:
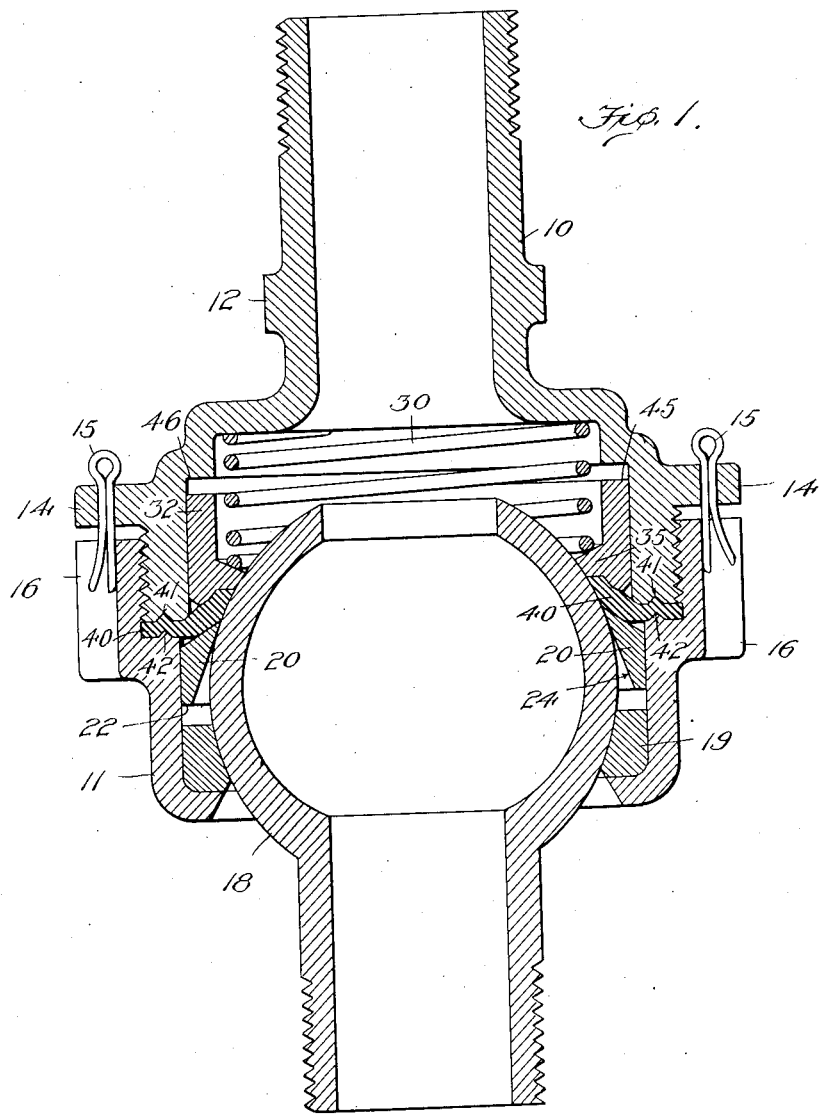
Figure 1 is a central vertical section through a typical example of ball joint embodying the present invention.

The casing 10 is secured to the sleeve 11 by threads in the customary manner, the casing being provided with the usual hexagonal nut 12 and the small lugs 14 perforated to receive cotter pins 15 after the two casings have been screwed together to the proper tightness, these cotter pins 15 passing between adjacent ribs 16 carried by the sleeve 11 which connection prevents the casing and sleeve 11 from unscrewing.

Figure 2:
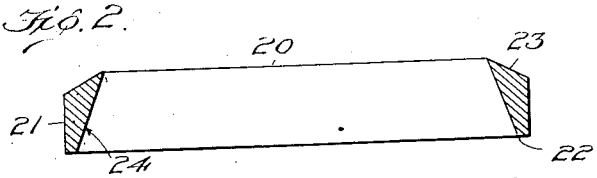
Fig. 2 is a cross section through the floating ring.
Figure 3:
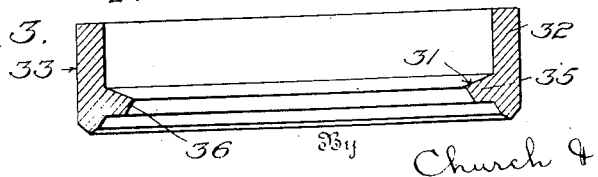
Fig. 3 is a cross section through the forming sleeve.

The ball member 18 and the lower metal gasket 18 are also of the usual type now common in the art, the novel elements of the joint being those now to be described. The floating ring 20 has an outer cylindrical surface 21, a plain lower surface 22, and conical upper and inner surfaces 23 and 24, respectively, the latter surfaces forming in cross section an acute angle as best seen in Fig. 2. This floating ring is "undercut", the angular annular surface 24 being straight and the bearing portion not being machined circular to conform to the shape of the ball 18 in order to prevent the cohesive friction which would be caused if the floating ring were machined to fit the ball or was made of the same curvature as the ball.

In the major cavity of the casing 10 is placed a spring 30 bearing at its free end on the slightly concave surface 31 of the forming sleeve 32 which is an annular member having a cylindrical outer surface 33 relieved at the bottom by a slight bevel 34 and having an inwardly projecting flange 35 the face 36 of which is substantially spherical, the lower face 37 substantially plain, and the upper surface 31 as previously stated being slightly dished.

The gasket 40 preferably consisting of a plurality of thicknesses of one-sixteenth inch material is pinched between the casing and the sleeve which members may be provided with an annular groove 41 and an annular rib 42 of the same diameter, if desired, in order to more securely hold the gasket 40. This gasket before being applied is a simple flat ring, but when laid in the joint it is directed by the upper face 23 of the floating ring into lapping engagement with the ball 18 and at its upper end it is engaged, guided, and positioned by the faces 44 and 37 of the forming sleeve thus causing the gasket to engage snugly the spherical surface of the ball.

While it is preferable to use two or more thicknesses of thin sheet material to form the gasket in order that it may more readily adapt itself to the spherical surface of the ball and to yield with movement of the ring 20, the purpose of the slidable ring is still secured when using single ply sheet material up to say five-sixteenths of an inch thick.

By providing the floating metal ring 20 and the gasket forming sleeve 32 the bad effects of any irregular wear of the ball are obviated which effects ordinarily would result in a setting up of a vibration or an irregular circular motion of the ball and would swage or hammer an ordinary gasket back off the ball thus allowing cinders and sand to creep in between the surface of the ball and the lower surface of the gasket resulting in an improper seating of the gasket.

It has been proposed to make the flange 35 integral with the casing 10, but the experimental types built in this manner have shown that when the joint between the two casings, that is, the casing 10 and the sleeve 11, was sufficiently tight to hold certain gaskets, the flange 35 would bind against the ball 18 and that it was practically impossible to prevent such undue pressure and the consequent locking of the ball, and furthermore when the position of the center of the sphere of the ball is lowered due to the usual wear, and the gasket has become hard by continued use the hammer action of the ball in its irregular movement would pound the gasket back and the onrush of steam would not lap the gasket properly against the ball resulting in a serious leakage.

But since the slidable sleeve 32 is yieldingly held against the ball at all times leakage is entirely prevented and it is not possible to put excess pressure on the gasket due to irregular action of the ball since the sleeve itself may move upward with the ball to a certain extent. Undue movement of the ball in the direction of the casing 10 is however prevented by the engagement of the top wall 45 with the shoulder 46 formed in the body portion or casing 10, this contact insuring against back thrust of the ball injuring the gasket. Similarly, the bearing sleeve, while guaranteeing that the gasket will hug the ball at a regulated distance at all times, is so constructed that the downward pressure of the steam together with the pressure of the spring may not force the gasket where it is overlapped on the ball sufficiently hard as to bind the ball or to unduly wear the gasket, the surface 36 of the sleeve engaging the ball at such a diameter as to prevent this action.

The floating ring 20 materially assists the sleeve in reducing vibrations of the ball and permits the yielding sleeve to act as a support for the ball. The action of the spring 30 tends to force the sleeve into the space triangular in cross section between the casing 10 and the ball, thus insuring that the ball even when moved quickly will not be thrown out of its circular path, the ring 20 moving upwardly with the ball against the action of the spring 30.

An important feature of the present invention is the elimination of careful machining. The slidable sleeve 32 may be a mere roughly finished casting, the floating ring 20 as stated is not spherical at its contact with the ball but is merely undercut, and an accurate contour of the metal gasket 19 is likewise not at all essential as by providing the yielding slidable sleeve the position of the ball, that is, whether high or low, will not affect the action between the ball and this gasket 19. The ring 20 by its wedge shape stabilizes the ball to a considerable degree and prevents the very objectionable movement of the ball from one side to the other.

The ring as shown has a plurality of functions: it counteracts vibration, seeming to insure that the ball moves in a true circle; it supports the overlapping gasket; it wipes the ball free of cinders and the like; and it lifts the gasket by the camming action of its upper surface 23 with a corresponding reduction of friction by permitting only a small portion of the gasket to come into contact with the ball.

What I claim is:

1. In a ball joint, a floating ring having an inclined face to engage the flexible gasket of said joint to lessen the amount of contact between said gasket and the ball said ring being movable toward and away from the gasket.

2. In a gasketed ball joint, a floating ring and a forming sleeve adapted to engage opposite sides of said gasket, said ring having a conical ball engaging face.

3. In a ball joint, a ball, a pair of casings surrounding said ball from opposite sides, a flexible gasket held between said casings, a floating ring having three annular faces and engaging said ball with one of its said faces, engaging said gasket with another of its said faces, and engaging one of the casings with the third of said faces.

4. In a ball joint, a ring engaging said ball and a forming sleeve having an outer cylindrical casing engaging surface, said sleeve also having an inner flange adapted to engage said ball and a gasket between said ring and sleeve.

5. In a ball joint, a gasket forming sleeve having an outer cylindrical surface, an inwardly directed annular flange, and an inclined guiding surface directing the gasket into contact with said ball.

6. In a ball joint, a gasket forming sleeve having an outer cylindrical surface, an inwardly directed annular flange, and an inclined guiding surface directing the gasket into contact with said ball, said flange having a ball engaging spherical surface.

7. In a ball joint, a gasket forming sleeve having an outer cylindrical surface, an inwardly directed annular flange, an inclined guiding surface directing the gasket into contact with said ball, said flange having a ball engaging spherical surface, and having a dished upper face.

8. In a ball joint, a pair of sliding ball engaging rings both located on the same side of a plane through the center of the ball, a gasket fast to the joint and positioned between said rings, and resilient means for compressing said gasket between said rings.

9. In a ball joint, a casing, a flat gasket, means intermediate the ball and casing for deflecting the inner edge of the gasket upward, and further means for limiting the upward deflection of said inner edge.

10. In a ball joint, a casing, a sleeve, a ball engaging gasket secured between said casing and sleeve, a ball member within said sleeve, and means for supporting said gasket while restricting contact between it and said ball.

11. In a ball joint, a casing, a sleeve, a ball engaging gasket secured between said casing and sleeve, a ball member within said sleeve, and means for supporting and deflecting the central portion of said gasket.

12. In a ball joint, a casing, a sleeve, a ball engaging gasket secured between said casing and sleeve, a ball member within said sleeve, and three spaced annular members, each engaging said ball two of said annular member determining the working contour of the third member.

13. In a ball joint, a casing, a sleeve, a ball engaging gasket secured between said casing and sleeve, a ball member within said sleeve, three spaced annular members each engaging said ball, and means for urging one of said members toward the other two.

14. In a ball joint, a casing, a sleeve secured thereto, a ball positioned between said sleeve and casing, a plurality of spaced rings within said sleeve, a resiliently mounted slidable ring within said casing, a gasket between two of said rings, and means carried by said slidable ring for limiting the back thrust of said ball.

15. In a ball joint of the type employing an annular gasket on either side of the center of the ball, characterized by the provision of a third ball-engaging gasket slidable within the ball chamber and adapted to stabilize the ball when in motion, said third gasket having a relatively sharp upper edge in proximity to its ball engaging surfaces formed by the junction of two conical surfaces, one of said surfaces engaging said ball in proximity to said edge and the other surface engaging and directing the flexible steam tight gasket into contact with said ball.

LEONIDAS D. WOODRUFF.